Patented Nov. 13, 1945

2,388,903

UNITED STATES PATENT OFFICE 2,388,903

MANUFACTURE OF AZO-METHINE COMPOUNDS

Troy L. Cantrell, Lansdowne, Pa., and John G. Peters, Audubon, N. J., assignors to Gulf Oil Corporation, Pittsburgh, Pa., a corporation of Pennsylvania No Drawing. Application April 29, 1943, Serial No. 485,064

13 Claims. (Cl. 260—240)

This invention relates to the manufacture of azo-methine compounds, and it comprises improved methods of making stable azo-methine compounds from primary aryl amines and aromatic aldehydes wherein approximately equimolecular proportions of the aldehyde and amine are reacted and condensed in the presence of a small amount of dicyclohexylamine, and it also comprises the stable, light-colored, azo-methine compounds so obtained; all as more fully hereinafter set forth and as claimed.

The aldehyde-amine condensation products obtained by condensing one mole of an aromatic aldehyde with one mole of a primary aryl amine, with elimination of one mole of water, are compounds having the formula

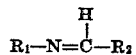

wherein $R_1$ and $R_2$ represent the organic radicals of the amine and aldehyde, respectively. The group, —N=CH—, is the characteristic group or structure in such compounds, and they are known and referred to hereinafter as azo-methine compounds.

As a class, compounds containing this unsaturated azo-methine group are susceptible to oxidation, polymerization and other deteriorative changes under conditions normally encountered in preparing, using and storing them. Such deterioration is accompanied by a discoloration or darkening of the composition; even slight deterioration producing an appreciable discoloration sufficient to render these compounds unsuitable for certain uses. In particular, azo-methine compounds are deleteriously affected by light and air. For instance, they gradually darken in color when exposed to sunlight and darken rapidly when exposed to air.

It is an object achieved by the present invention to provide a simple and effective method for the production of azo-methine compounds whereby light-colored products can be readily prepared which are resistant to deterioration and discoloration, even when exposed to light and air.

We have found that by incorporating small amounts of dicyclohexylamine in the reaction mixture during the condensation of the aromatic aldehyde with the primary aryl amine in the production of an azo-methine compound, we can effectively stabilize the azo-methine compound so formed. Usually, the addition of 1 to 10 per cent by weight of dicyclohexylamine to the reaction mixture is sufficient to produce a product stable to light and air. These small amounts of dicyclohexylamine retard excessive exothermic temperatures, polymerization, oxidation, and other deteriorative changes during the reaction so effectively that azo-methine compounds which retain their original color can be readily prepared. Likewise, the improved azo-methine compounds thus produced contain a small amount of dicyclohexylamine and retain their original color even after extended exposure to light and air.

In addition to imparting these advantageous properties to the azo-methine compounds so prepared, dicyclohexylamine has other advantages in our improved method of making stable azo-methine compounds which retain their original color over a period of time. It also retards the rate of the reaction of the aldehyde and the primary amine, and facilitates control of the main reaction. Apparently the added dicyclohexylamine, in addition to inhibiting polymerization and oxidation of the azo-methine compound, also restrains the production of resinous aldehyde-amine products by side reactions between these materials. In any event, the azo-methine compounds so obtained are substantially free of resinous byproducts or other colored material.

These stable azo-methine compounds can be readily prepared according to our invention by condensing one mole of an aromatic aldehyde with one mole of a primary aromatic amine in the presence of a relatively small amount of dicyclohexylamine, usually 1 to 10 per cent by weight on the reaction mixture being employed. In most cases, from 1 to 2 per cent of dicyclohexylamine is sufficient for the present purposes. The dicyclohexylamine stabilizer may be incorporated in the reaction mixture in any convenient way. For instance, it may be added to the primary aryl amine prior to reaction with the aldehyde. This is particularly advantageous in preparing azo-methine compounds from aniline and various aromatic aldehydes. Aniline, itself, discolors and darkens when exposed to light and air and such addition of dicyclohexylamine to the aniline prior to reaction with the aldehyde retards discoloration of the aniline prior to and during the reaction, in addition to preventing deterioration of the azo-methine compounds formed therefrom. In this way, very light-colored and stable azo-methine compounds can be prepared from aniline. For example, stable benzal-aniline prepared by our improved method, wherein equimolecular proportions of benzaldehyde and aniline are condensed together in the presence of from 1 to 2 per cent of dicyclohexylamine, is a very light-colored product which retains its original color even after extended exposure to light and air.

Our improved method is useful and advantageous in preparing a wide variety of azo-methine compounds from various aromatic aldehydes and primary aryl amines. We may, for example, employ substituted benzaldehydes such as 2-hydroxy-5-methyl-benzaldehyde, p-dimethylamino benzaldehyde and the like, in our improved methods in lieu of benzaldehyde. Likewise, toluidine, xylidines, anisidine, nitroaniline and other substituted anilines may be employed in lieu of aniline itself.

Stable azo-methine compounds containing poly-nuclear carbocyclic groups, such as naphthalene, diphenyl, and the like, in place of one or both of the simple benzene rings of benzalaniline, can also be prepared by our process from arylamines and aromatic aldehydes containing such poly-nuclear carbocyclic groups. Further, the stable azo-methine compounds obtainable by this invention are not restricted to those derived from mono-amines such as naphthylamine, aniline and substitution products thereof, but also include the azo-methine compounds derived from the phenylene diamine tolidine, benzidine and other polyamines. In such cases more than one of the primary amino groups may be condensed with an aromatic aldehyde thus forming a plurality of azo-methine groups. In preparing such compounds we usually employ slightly greater amounts of dicyclohexylamine, as azo-methine compounds containing a plurality of azo-methine groups are somewhat more difficult to stabilize. In most cases the desired stability is obtained with from 0.5 to 10 per cent of dicyclohexylamine by weight in the reaction mixture.

The arylamines can also be condensed with other aromatic aldehydes, such as cinnamic aldehyde, furfural aldehyde, furfuracrylaldehyde, and the like, by our improved methods to obtain still other stable azo-methine compounds. Thus cinnamic aldehyde, which is conveniently formed by condensing one mole of benzaldehyde with one mole of acetaldehyde with the elimination of one mole of water, may be employed as the aldehyde in our improved processes and combined with aniline or other aromatic amine to obtain stable azo-methine compounds. Furfuracrylaldehyde, which is conveniently formed by condensing one mole of furfuraldehyde with one mole of acetaldehyde, with elimination of one mole of water, may be combined with aniline or other arylamines in our improved processes to obtain furfuracrylidene aniline. Furfuraldehyde itself is also useful and advantageous in preparing stable azo-methine compounds by our improved methods. It may be condensed with aniline or the other primary arylamines in the process or our invention to obtain stable light-colored azo-methine compounds containing a furyl group.

The production of stable azo-methine compounds according to our invention is further illustrated in the following specific examples wherein the parts specified are parts by weight.

*Example I.*—A stable benzalaniline (benzalidene aniline) was prepared as follows:

To 93 parts of aniline were added, while stirring, 2 parts of dicyclohexylamine and then 106 parts of benzaldehyde. The mixture was maintained at 105° C. until the reaction was complete. The water formed during the reaction was removed by distillation.

The reaction was exothermic but the presence of dicyclohexylamine kept the exothermic reaction from progressing too rapidly and kept the temperature from increasing too rapidly; the reaction mixture being maintained at 105° C., as stated ante.

After the reaction was complete and the water distilled off, the molten reaction product was cooled to room temperature and recovered as a light colored flaky compound having a melting point of 50° C.

The stable benzalaniline obtained as described ante was very light in color and retained its light color even when exposed to light and air over a period of time. It was readily soluble in gasoline and when dissolved in ethyl gasoline effectively suppressed haze formation and inhibited precipitation of tetraalkyl lead compounds.

In the above example, other primary arylamines or aromatic aldehydes may be used in lieu of aniline and benzaldehyde and reacted in the presence of dicyclohexylamine to produce other stable azo-methine compounds as stated ante. That is, the presence of the dicyclohexylamine in the reaction mixtures is essential to obtain the improved results described ante. For instance, if the dicyclohexylamine is omitted in Example I, the reaction product obtained is not stable and rapidly deteriorates; first turning yellow and finally becoming very dark in color. Likewise, other azo-methine compounds prepared in the absence of dicyclohexylamine are unstable when exposed to light and air. The use of dicyclohexylamine in improving and stabilizing other azo-methine compounds is further illustrated in the specific examples given post.

*Example II.*—In this example, a liquid stable azo-methine compound was prepared as follows:

To 93 parts of aniline were gradually added, with stirring, 5 parts of dicyclohexylamine and then 96 parts of furfuraldehyde and 200 parts of benzene. The reaction mixture so prepared was then heated to 82° C. until the reaction was complete; the water formed during the reaction being simultaneously distilled off as an azeotropic mixture with some benzene.

The furfuralaniline so prepared was a reddish liquid soluble in gasoline but insoluble in water. It was stable and retained its property of stabilizing tetraalkyl lead solutions even when exposed to sunlight and air over a period of time.

*Example III.*—A stable azo-methine compound was prepared from 3,5-xylidine and benzaldehyde as follows:

To 121 parts of 3,5-xylidine were added, with stirring, 3 parts of dicyclohexylamine and then 106 parts of benzaldehyde. While the mixture was stirred, the temperature was increased to 105° C. and held at that temperature until the reaction was complete as evidenced by the cessation of the formation of water.

The liquid benzalxylidine so prepared had the following properties:

| | |
|---|---|
| Molecular weight | 209 |
| Gravity: ° API | 5.5 |
| Ap. Gr., 60°/60° F | 1.0328 |
| Viscosity, SUV 100° F | 59.9 |
| Pour: ° F | +25 |
| Color, NPA | 3 |
| Solubility in gasoline | Soluble |

*Example IV.*—Another suitable azo-methine compound was prepared as follows:

To 66 parts of cinnamaldehyde were added, while stirring, 2 parts of dicyclohexylamine and 60.5 parts of 3,5-xylidine. The reaction mixture so prepared was then heated to 95° C. until the reaction was complete. The yield of azo-methine compound was practically quantitative.

The stable cinnamylidene-xylidine so obtained was effective in all types of ethyl gasoline. It was dark red in color when freshly prepared and did not darken when exposed to light and air.

The foregoing examples are typical illustrations of the preparation of stable azo-methine compounds according to the present invention and other stable azo-methine compounds may be prepared in the same manner by reacting other suitable aromatic aldehydes and primary arylamines in the presence of dicyclohexylamine. In fact, we have prepared and tested a large number of such compounds. Of these, the following azo-methine compounds are particularly useful and advantageous for the present purposes:

Benzalaniline
Benzalxylidine
Benzal-betanaphthylamine
Benzal-alphanaphthylamine
Benzal-o-toluidine
Benzal-p-toluidine
Benzal-o-anisidine
Benzal-p-anisidine
Benzal-p-aminoazobenzene
p-Dimethylaminobenzalxylidine
2-hydroxy, 5-methylbenzalaniline
p-Dimethylaminobenzal-p-dimethylaminoaniline
p-Dimethylaminobenzalaniline
Dibenzal-p-phenylenediamine
Dibenzal-o-tolidine
Cinnamylideneaniline
Cinnamylenexylidine
Furfuralaniline
Furfuralxylidine
Furfural-p-toluidine
Furfural-o-tolidine
Furfural benzal-o-tolidine
Furfuracrylideneaniline The above compounds and other stable azo-methine compounds can be readily prepared by our improved methods described and illustrated ante.

Among the advantages of our improved methods in that they readily produce azo-methine compounds which are more useful and advantageous for many commercial purposes. In particular, our stable light-colored azo-methine compounds are advantageous addition agents for ethyl gasoline and other solutions of tetra-alkyl lead compounds. Haze formation in solutions of tetra-alkyl lead compounds, such as ethyl fluid and ethyl gasoline can be very materially reduced by incorporating in such solutions small quantities, proportioned on the amount of tetra-alkyl lead compound in solution of azo-methine compounds. Our improved azo-methine compounds are particularly advantageous for this use. As they are themselves relatively stable against light and air, they do not deteriorate or lose their haze inhibiting power to any great extent when the ethyl gasoline or some solutions of tetra-alkyl lead compounds are exposed to light or air in commercial use. They do not adversely affect the antiknock quality or oxygen stability of leaded gasoline, or promote gum formation. They are non-corrosive to common packaging materials such as steel, zinc, copper and tin, and are compatible with the dyes commonly used in ethyl gasoline to give it a distinctive appearance. Any they possess all of the other properties which recommend azo-methine compounds generally for this use.

Likewise, our stable azo-methine compounds are useful and advantageous for other purposes wherein azo-methine compounds have been previously employed.

While our invention has been described herein with reference to particular embodiments and specific examples thereof, it is not limited to such embodiments and examples, except as hereinafter defined in the appended claims.

In general, our invention is broadly applicable to the manufacture of improved, stable, azo-methine compounds from primary aryl amines and aromatic aldehydes, as illustrated ante. As there shown, a wide variety of such amines and aldehydes may be employed, including aromatic aldehydes containing heterocyclic groups in the organic radical thereof, as well as aryl aldehydes; the term "aromatic aldehydes" being used in its broad generic scope.

What we claim is:

1. A process of producing improved azo-methine compounds comprising reacting a primary arylamine with an aromatic aldehyde in the presence of a small amount of dicyclohexylamine.

2. A process of producing stable azo-methine compounds comprising reacting a primary arylamine with an aromatic aldehyde in the presence of an amount of dicyclohexylamine sufficient to stabilize the azo-methine compound against light and air.

3. A process of producing stable azo-methine compounds comprising reacting a primary arylamine with an aromatic aldehyde in the presence of 1 to 10 per cent by weight of dicyclohexylamine.

4. A process of producing stable light-colored benzalaniline comprising reacting equimolecular proportions of aniline and benzaldehyde in the presence of 1 to 10 per cent by weight of dicyclohexylamine.

5. A process of producing stable fural-aniline comprising condensing equimolecular proportions of aniline and furfuraldehyde in the presence of 1 to 10 per cent by weight of dicyclohexylamine.

6. As a new composition of matter, a stable azo-methine compound obtained by reacting a primary aryl amine with an aromatic aldehyde in the presence of a small amount of dicyclohexyl amine, said azo-methine compound containing after completion of the reaction a modicum of dicyclohexyl amine and being stable and resistant to deterioration by light and air.

7. As a new composition of matter, the stable light-colored benzal-aniline compound obtained by reacting equimolecular proportions of aniline and benzaldehyde in the presence of 1 to 10 per cent by weight of di-cyclohexyl amine, said benzal-aniline compound containing after completion of the reaction a modicum of dicyclohexyl amine and being stable and resistant to deterioration by light and air.

8. As a new composition of matter, the stable, fural-aniline compound obtained by reacting equimolecular proportions of aniline and furfuraldehyde in the presence of 1 to 10 per cent of di-cyclohexyl amine, said fural-aniline compound containing after completion of the reaction a modicum of dicyclohexyl amine and being stable and resistant to deterioration by light and air.

9. The process of claim 1 wherein said aromatic aldehyde is furfuraldehyde.

10. The process of claim 1 wherein said aromatic aldehyde is benzaldehyde.

11. The process of claim 1 wherein said amine is aniline.

12. The process of claim 1 wherein said amine is 3,5-xylidine.

13. The process of claim 1 wherein said primary aryl amine is a mono-amine.

TROY L. CANTRELL.
JOHN G. PETERS.